United States Patent
Chinomi et al.

(10) Patent No.: US 7,652,559 B2
(45) Date of Patent: Jan. 26, 2010

(54) VEHICLE SURROUNDINGS DISPLAY UNIT AND A METHOD OF DISPLAYING VEHICLE SURROUNDINGS

(75) Inventors: Satoshi Chinomi, Yokohama (JP); Masami Funakawa, Tsukuba (JP); Tatsumi Yanai, Tokyo (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 392 days.

(21) Appl. No.: 11/812,297

(22) Filed: Jun. 18, 2007

(65) Prior Publication Data
US 2007/0296566 A1 Dec. 27, 2007

(30) Foreign Application Priority Data
Jun. 20, 2006 (JP) .............................. 2006-169694

(51) Int. Cl.
*B60Q 1/00* (2006.01)
*G08G 1/017* (2006.01)
*G08G 1/054* (2006.01)
*G05D 1/02* (2006.01)
*G06F 17/10* (2006.01)
*G06G 7/78* (2006.01)

(52) U.S. Cl. ..................... 340/435; 340/436; 340/937; 701/300

(58) Field of Classification Search ............... 340/435, 340/436, 937; 701/300; 382/106, 107, 233
See application file for complete search history.

(56) References Cited

U.S. PATENT DOCUMENTS

| | | | | |
|---|---|---|---|---|
| 5,642,299 | A * | 6/1997 | Hardin et al. ............... | 702/142 |
| 6,396,397 | B1 * | 5/2002 | Bos et al. .................... | 340/461 |
| 6,477,260 | B1 * | 11/2002 | Shimomura ................ | 382/106 |
| 6,636,257 | B1 * | 10/2003 | Harada et al. ............... | 348/148 |
| 7,126,460 | B2 * | 10/2006 | Yamada ....................... | 340/435 |
| 7,437,243 | B2 * | 10/2008 | Fujimoto .................... | 701/300 |

FOREIGN PATENT DOCUMENTS

JP 2004-173048 6/2004

* cited by examiner

*Primary Examiner*—Jennifer Mehmood
(74) *Attorney, Agent, or Firm*—Foley & Lardner LLP

(57) ABSTRACT

A vehicle surroundings display unit, including: 1) a pick-up unit for picking up a video of vehicle surroundings; 2) an approaching vehicle sensor for sensing, based on the video picked up by the pick-up unit, an approaching vehicle which is approaching a subject vehicle; 3) a display processor for displaying the approaching vehicle sensed by the approaching vehicle sensor while distinguishing the approaching vehicle from an obstacle which is not approaching the subject vehicle; 4) a display unit for displaying the video which has undergone the displaying operation by the display processor; and 5) a frequency decomposing unit to make the following operations: decomposing a time-varying component of a pixel of the picked-up video for each frequency, extracting the pixel having a frequency of the time-varying component higher than a certain frequency, and of the thus extracted pixels of the picked up video, displaying the pixels in a vehicle area.

12 Claims, 9 Drawing Sheets

VEHICLE SURROUNDINGS DISPLAY UNIT AND A METHOD OF DISPLAYING VEHICLE SURROUNDINGS

BACKGROUND OF THE INVENTION

1. Field of the Invention

The present invention relates to a unit for picking up and displaying a video of surroundings of a vehicle. Moreover, the present invention relates to a method of displaying the vehicle surroundings.

2. Description of the Related Art

Japanese Patent Laid-Open Publication No. 2004-173048 (=JP2004173048) discloses a conventional technology. Based on a plurality of picked-up videos of surroundings of a vehicle, the above conventional technology obtains an optical flow through template matching, detects other vehicle on the picked-up videos and displays the other vehicle on a monitor.

However, the conventional method according to JP2004173048 has the following inconvenience (paragraphs [0016] and [0017]): For selectively displaying a mobile body approaching a subject vehicle, a speed vector of each pixel in the video is calculated by taking a frame-to-frame difference, sensing the following video area as one mobile body: a video area having speed vectors which are different from those of the subject vehicle and which are same as each other. Thereby, the video processing is complicated, increasing operation (calculation) quantity.

SUMMARY OF THE INVENTION

It is therefore an object of the present invention to provide a vehicle surroundings display unit. Based on a picked-up video of vehicle surroundings, the vehicle surroundings display unit of a subject vehicle detects an approaching vehicle and displays the thus detected approaching vehicle which is distinguished from an obstacle not approaching the subject vehicle.

It is another object of the present invention to provide a method of displaying the vehicle surroundings.

According to a first aspect of the present invention, there is provided a vehicle surroundings display unit, comprising: 1) a pick-up unit for picking up a video of vehicle surroundings; 2) an approaching vehicle sensor for sensing, based on the video picked up by the pick-up unit, an approaching vehicle which is approaching a subject vehicle; 3) a display processor for displaying the approaching vehicle sensed by the approaching vehicle sensor while distinguishing the approaching vehicle from an obstacle which is not approaching the subject vehicle; 4) a display unit for displaying the video which has undergone the displaying operation by the display processor; and 5) a frequency decomposing unit configured to make the following operations: i) decomposing a time-varying component of a pixel of the picked-up video for each frequency, ii) extracting the pixel having a frequency of the time-varying component higher than a certain frequency, and iii) of the thus extracted pixels of the picked up video, displaying the pixels in a vehicle area.

According to a second aspect of the present invention, there is provided a method of displaying vehicle surroundings, comprising: 1) picking up a video of the vehicle surroundings; 2) sensing, based on the video thus picked up, an approaching vehicle which is approaching a subject vehicle; 3) displaying the approaching vehicle thus sensed while distinguishing the approaching vehicle from an obstacle which is not approaching the subject vehicle; 4) displaying the video which has undergone the displaying operation of the approaching vehicle; and 5) decomposing a frequency, the decomposing including the following sub-operations: i) decomposing a time-varying component of a pixel of the picked-up video for each frequency, ii) extracting the pixel having a frequency of the time-varying component higher than a certain frequency, and iii) of the thus extracted pixels of the picked up video, displaying the pixels in a vehicle area.

According to a third aspect of the present invention, there is provided a vehicle surroundings display unit, comprising: 1) picking-up means for picking up a video of vehicle surroundings; 2) approaching vehicle sensing means for sensing, based on the video picked up by the picking-up means, an approaching vehicle which is approaching a subject vehicle; 3) display processing means for displaying the approaching vehicle sensed by the approaching vehicle sensing means while distinguishing the approaching vehicle from an obstacle which is not approaching the subject vehicle; 4) displaying means for displaying the video which has undergone the displaying operation by the displaying means; and 5) frequency decomposing means configured to make the following operations: i) decomposing a time-varying component of a pixel of the picked-up video for each frequency, ii) extracting the pixel having a frequency of the time-varying component higher than a certain frequency, and iii) of the thus extracted pixels of the picked up video, displaying the pixels in a vehicle area.

The other object(s) and feature(s) of the present invention will become understood from the following description with reference to the accompanying drawings.

DESCRIPTION OF THE PREFERRED EMBODIMENTS

In the following, various embodiments of the present invention will be described in detail with reference to the accompanying drawings.

For ease of understanding, the following description will contain various directional terms, such as left, right, upper, lower, forward, rearward and the like. However, such terms are to be understood with respect to only a drawing or drawings on which the corresponding part of element is illustrated.

Figure 1:
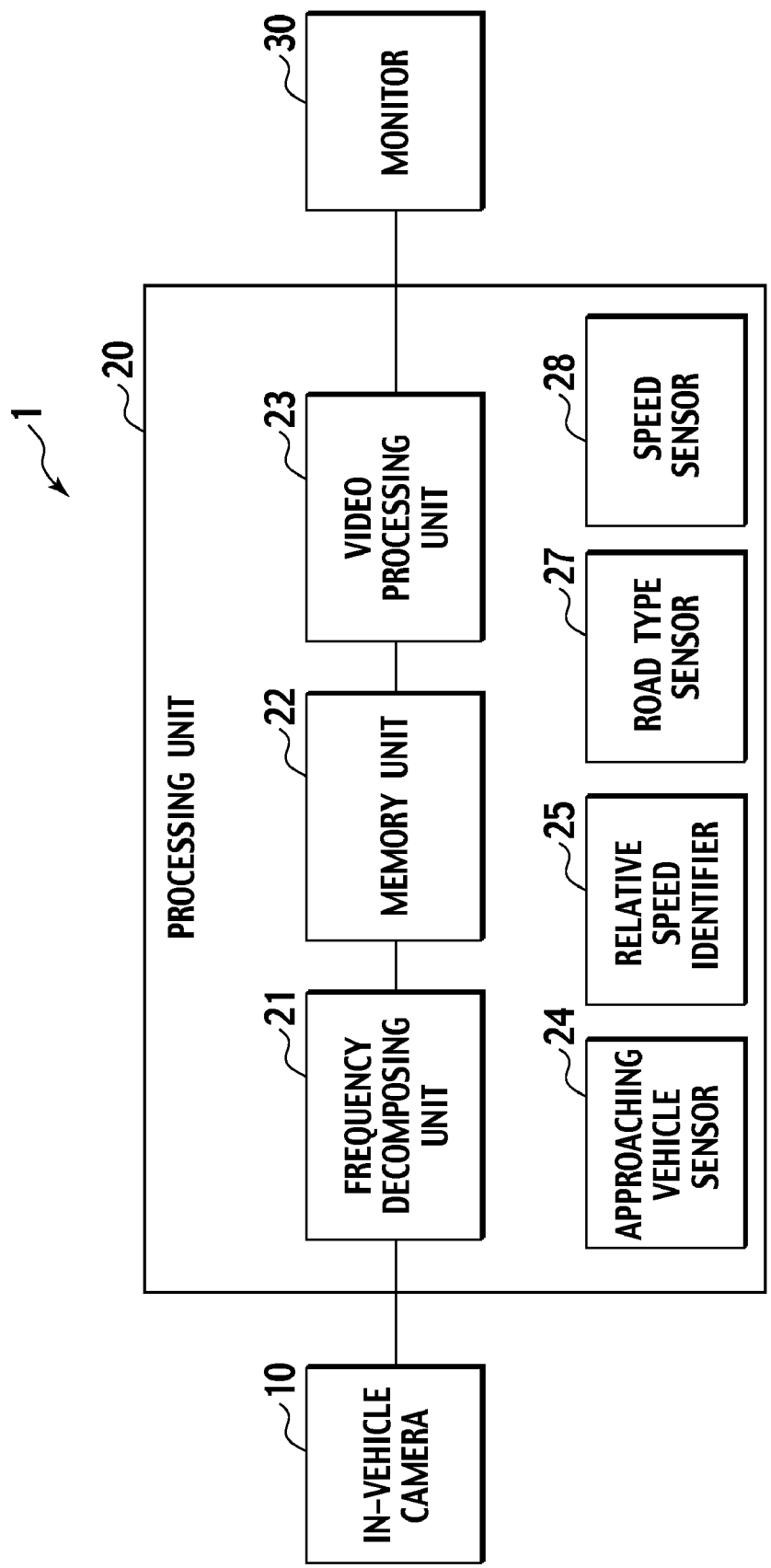
FIG. 1 is a view showing a structure of a vehicle surroundings display unit, according to an embodiment of the present invention.
Figure 2:
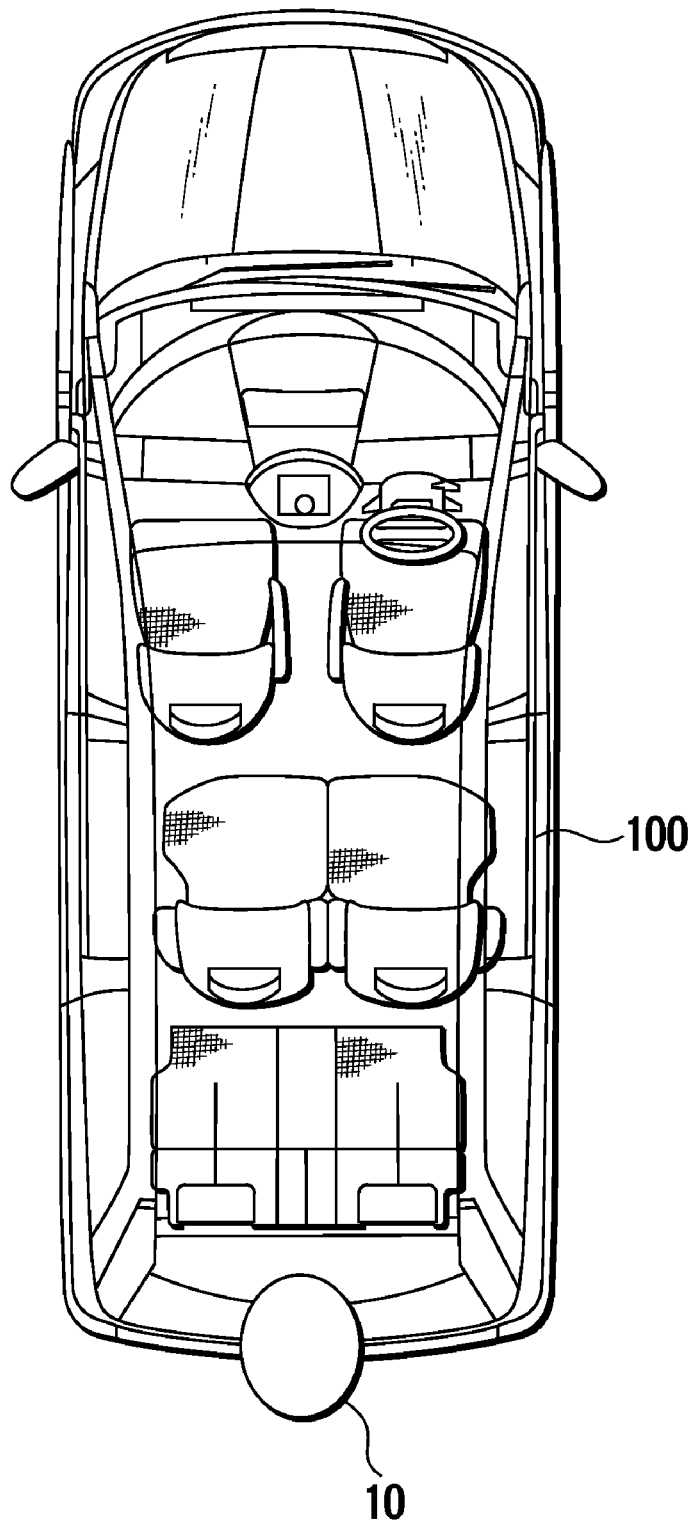
FIG. 2 is a view showing an example of a location where an in-vehicle camera is attached.

FIG. 1 is a view showing a structure of a vehicle surroundings display unit 1, according to an embodiment of the present invention. The vehicle surroundings display unit 1 includes an in-vehicle camera 10 (otherwise referred to as "pick-up unit"), a processing unit 20, and a monitor 30. FIG. 2 is a view showing an example of a location where the in-vehicle camera 10 is attached. As shown in FIG. 2, the in-vehicle camera 10 is attached to the rear center of a subject vehicle 100 and picks up videos of the subject vehicle 100's rearward.

For internal process functions, the processing unit 20 includes a frequency decomposing unit 21, a memory unit 22, and a video processing unit 23 (otherwise referred to as "display processor"). Based on the videos picked up by the in-vehicle camera 10, the frequency decomposing unit 21 performs a process to decompose time-varying components of videos for each frequency domain. The memory unit 22 memorizes the data which is decomposed by the frequency decomposing unit 21 for each frequency domain. Based on the data decomposed by the frequency decomposing unit 21 for each frequency domain, the video processing unit 23 makes the following operations: i) detecting a vehicle approaching the subject vehicle 100 and ii) generating a video for displaying the detected approaching vehicle while distinguishing the approaching vehicle from an obstacle which is not approaching the subject vehicle 100. The monitor 30 displays the video generated by the video processing unit 23.

The processing unit 20 further includes an approaching vehicle sensor 24, a relative speed identifier 25, a road type sensor 27, and a speed sensor 28.

Figure 3:
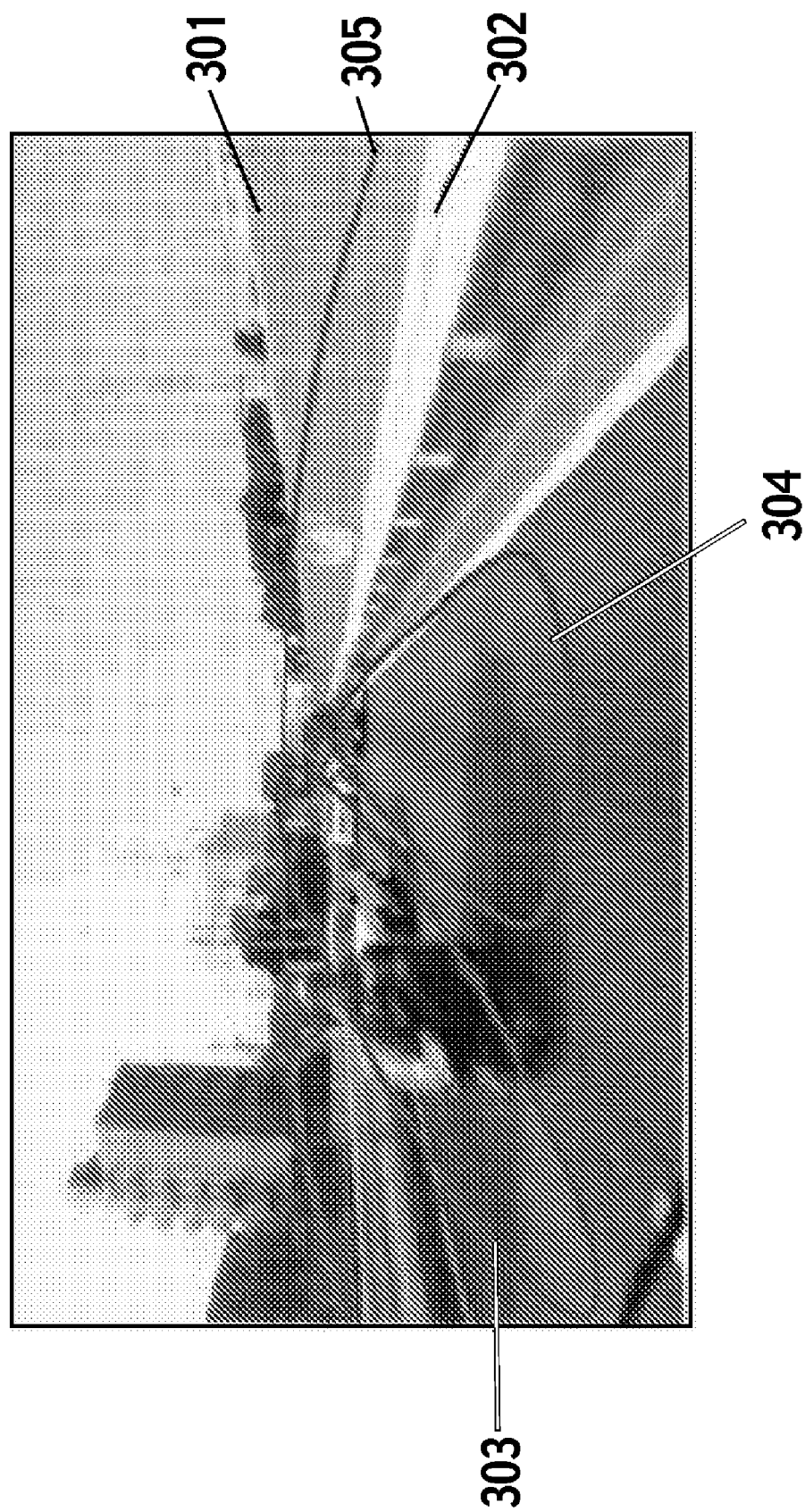
FIG. 3 is a view showing an example of a video picked up by the in-vehicle camera.

FIG. 3 is a view showing an example of a video of the subject vehicle 100's rearward picked up by the in-vehicle camera 10. In FIG. 3, a parting line 305 extending to the left and right at the longitudinal center of the video partitions the video into a background area 301 and a vehicle area 302. The parting line 305 is set in advance based on an imaging direction or the like of the in-vehicle camera 10. On the picked-up video; the background area 301 is an area where a background such as the sky or apartment buildings is mainly captured, while the vehicle area 302 is an area where other vehicle or the like is mainly captured. The vehicle area 302 includes i) an adjacent lane area 303 (otherwise referred to as "first lane area") which shows an adjacent lane, and ii) a same lane area 304 (otherwise referred to as "second lane area") which shows a lane in which the subject vehicle 100 is traveling.

Based on the videos picked up by the in-vehicle camera 10, the frequency decomposing unit 21 performs the process to decompose the time-varying components of the videos for each frequency domain. Here, the process to decompose the time-varying components of the videos for each frequency domain is referred to as time-frequency decomposition.

Figure 4:
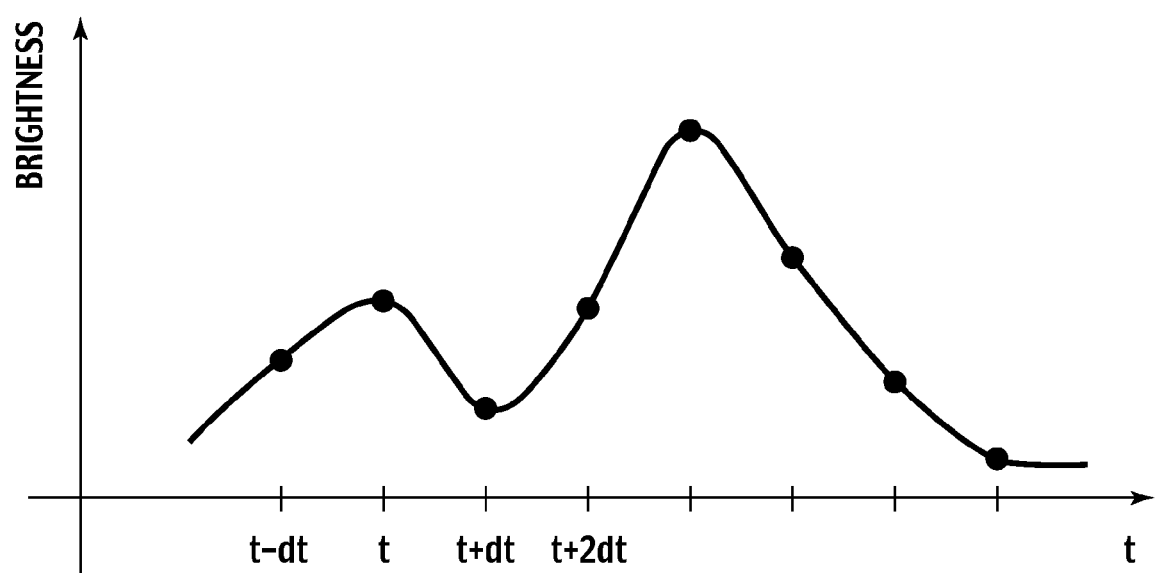
FIG. 4 is a view showing brightness variation (relative to time) of a single pixel (x, y) on the picked up video.

FIG. 4 is a view showing brightness variation (relative to time) of a single pixel (x, y) on the picked-up video. The frequency decomposing unit 21 decomposes (or divides) the brightness variation (relative to time) into frequency components. For example, the frequency decomposing unit 21 makes the following operations: 1) operating (calculating) an average of brightness for each pixel based on a plurality of video frames picked up at different times, 2) obtaining differences between i) the thus operated (calculated) average brightness and ii) brightness of current videos, 3) then, categorizing the differences for each frequency domain. In a case where the video is picked up at 30 frames per second, a bandpass filter is categorized into a specific frequency. The data decomposed for each frequency domain by the frequency decomposing unit 21 is memorized in the memory unit 22.

Once the time-frequency decomposition process is performed, pixels with small brightness variation are categorized into a low-frequency component, and pixels with large brightness variation are categorized into a high-frequency component. Therefore, brightness of pixels in which the sky or ground (road) is captured does not vary over time, and therefore the above pixels are extracted as the low frequency component. On the other hand, in the case of i) pixels in which the approaching vehicle is captured or ii) pixels which move on the video as the subject vehicle 100 travels, i.e., such pixels as those for a pylon (otherwise referred to as "steel tower"), the brightness varies over time, and therefore the above pixels i) and ii) are extracted as the high frequency component.

Figure 5C:
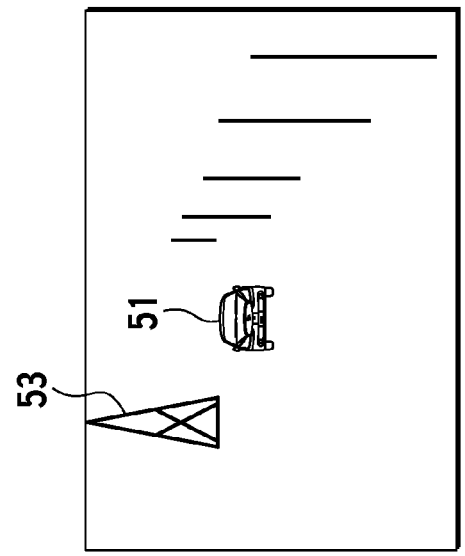
FIG. 5C is a view showing a video reconstructed by extracting a high frequency component based on data after the time-frequency decomposition process.
Figure 5B:
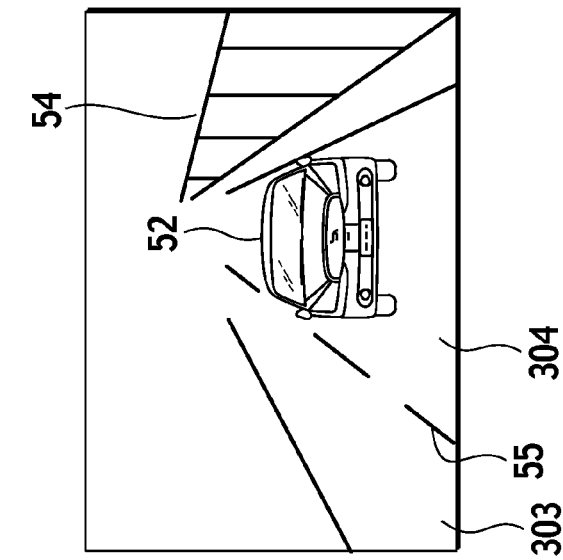
FIG. 5B is a view of a video restructured by extracting a low frequency component based on data after time-frequency decomposition process.
Figure 5A:
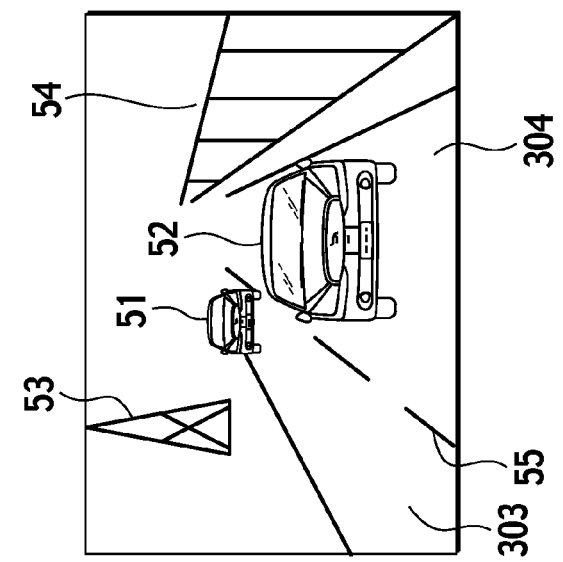
FIG. 5A is a view showing an example of the video picked up by the in-vehicle camera.

FIG. 5A is a view showing an example of the video of the subject vehicle 100's rearward picked up by the in-vehicle camera 10. In the video shown in FIG. 5A, a first rear vehicle 51, a second rear vehicle 52, a pylon 53, a side wall 54, and so forth are captured. Here, it is assumed that the first rear vehicle 51 traveling in the adjacent lane 303 is trying to overtake the subject vehicle 100, and the second rear vehicle 52 traveling just behind the subject vehicle 100 is traveling at substantially the same speed as that of the subject vehicle 100.

FIG. 5B is a view of a video restructured by the following sequential operations: i) performing the time-frequency decomposition process by the frequency decomposing unit 21, and then ii) extracting a low frequency component lower than a certain frequency. Further, FIG. 5C is a view of a video restructured by the following sequential operations: i) performing the time-frequency decomposition process by the frequency decomposing unit 21, and then ii) extracting a high frequency component higher than the certain frequency. Since the brightness of pixels of the second rear vehicle 52 traveling at substantially the same speed as that of the subject vehicle 100 hardly vary, the second rear vehicle 52 is extracted as the low frequency component. Moreover, since the side wall 54 and a white line 55 on the ground are continuous and captured on the picked-up video as if they are static, they are extracted as the low frequency component. On the other hand, each of the approaching vehicle 51 and the pylon 53 which move on the video as the subject vehicle 100 travels is extracted as the high frequency component.

Based on the data decomposed by the frequency decomposing unit 21 for each frequency domain, the video processing unit 23 makes the following operations: i) detecting the first rear vehicle 51 approaching the subject vehicle 100 and ii) generating a video for displaying the detected approaching vehicle 51 while distinguishing the approaching vehicle 51 from an obstacle which is not approaching the subject vehicle 100. A method for generating the video for displaying the approaching vehicle 51 while distinguishing the approaching vehicle 51 from another obstacle is described below.

Figure 6:
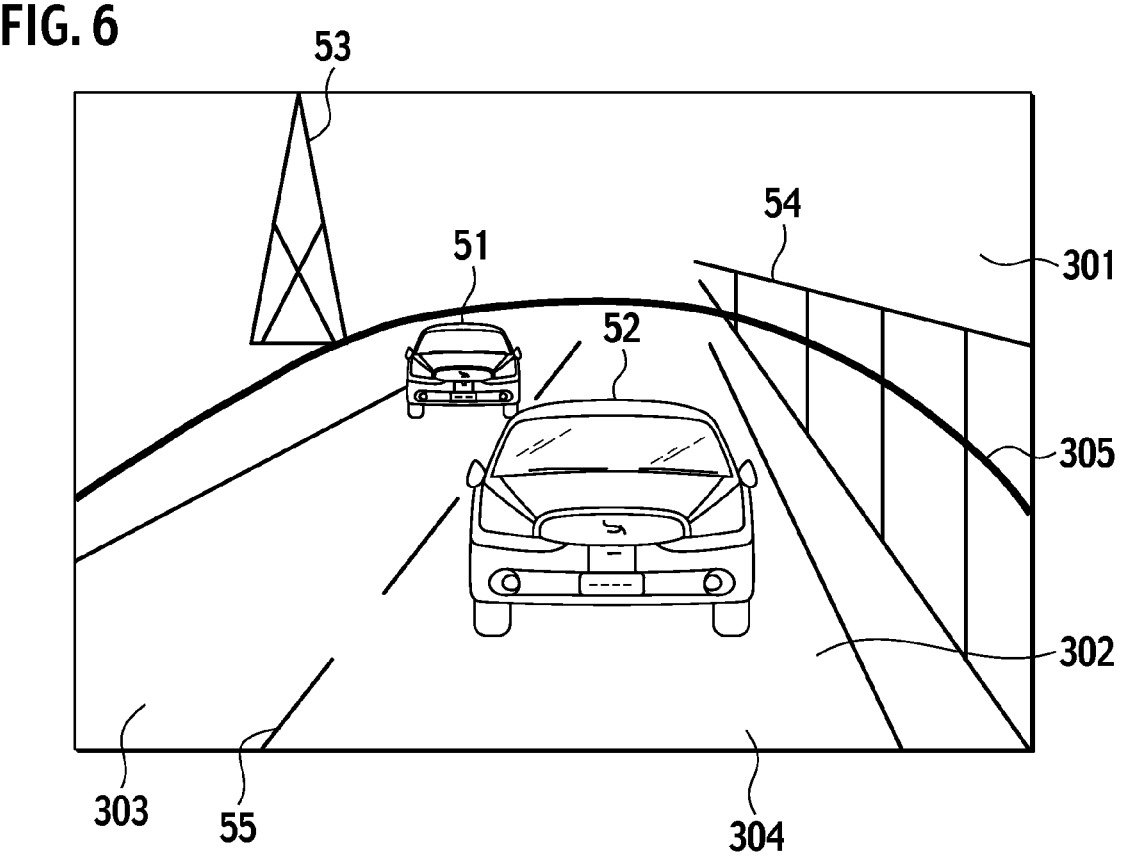
FIG. 6 is a view showing an example of the video picked up by the in-vehicle camera.
Figure 7:
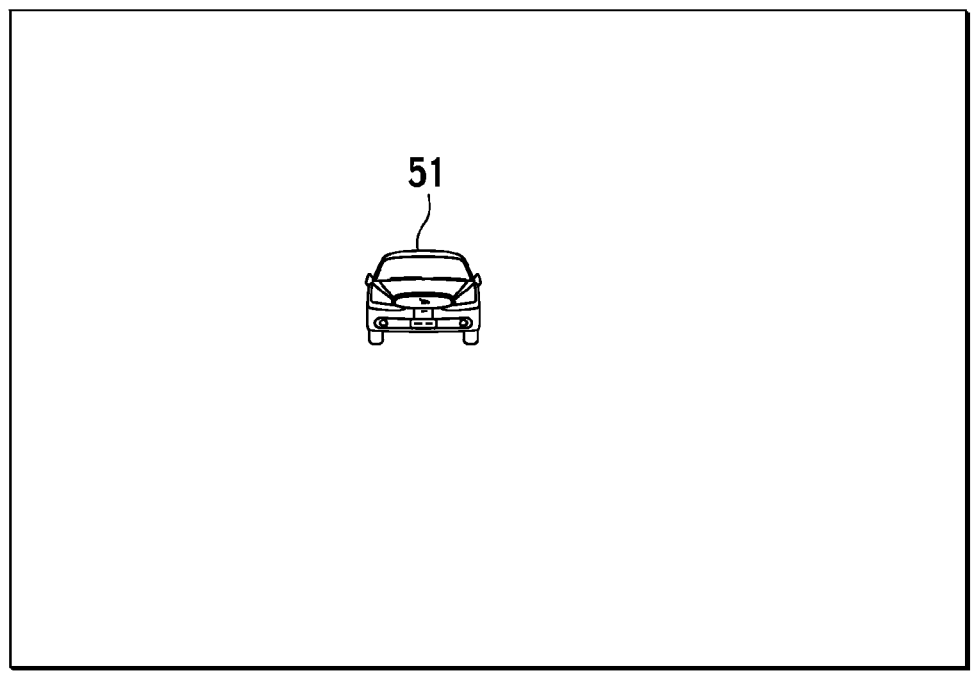
FIG. 7 is a view showing data of the high frequency component within a vehicle area.

FIG. 6 is a view showing an example of the video of the subject vehicle 100's rearward picked up by the in-vehicle camera 10. At first, the frequency decomposing unit 21 performs the time-frequency decomposition process. From the data memorized in the memory unit 22, the video processing unit 23 extracts the data of the high frequency component in the vehicle area 302. FIG. 7 is a view showing the data of the high frequency component thus extracted. As stated earlier, the pylon 53 captured in FIG. 6 is the high-frequency component from the data after the time frequency decomposition process. The pylon 53 included in the background area 301 instead of the vehicle area 302 is, however, not extracted in FIG. 7.

Figure 8:
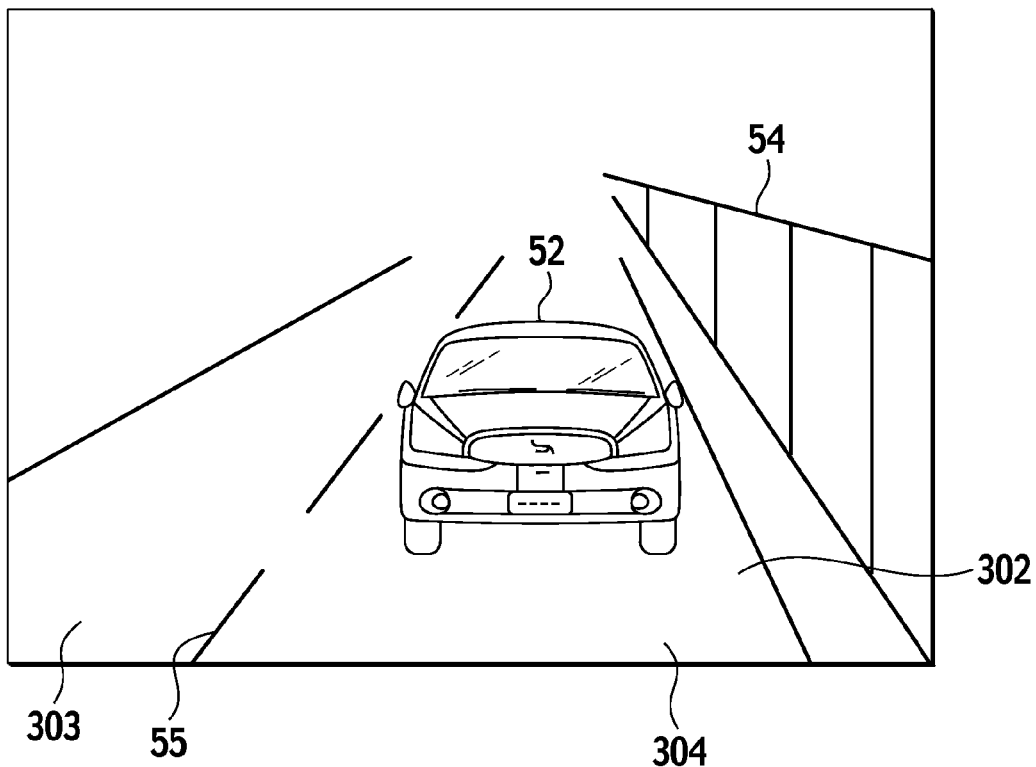
FIG. 8 is a view showing data of the low frequency components.

Next, the frequency decomposing unit 21 performs the time-frequency decomposition process. From the data memorized in the memory unit 22, the video processing unit 23 extracts the data of the low frequency component. Here, not only the vehicle area 302 but also the background area 301 is subject to the time-frequency decomposition process. FIG. 8 is a view showing the data of the low frequency component thus extracted.

Figure 9:
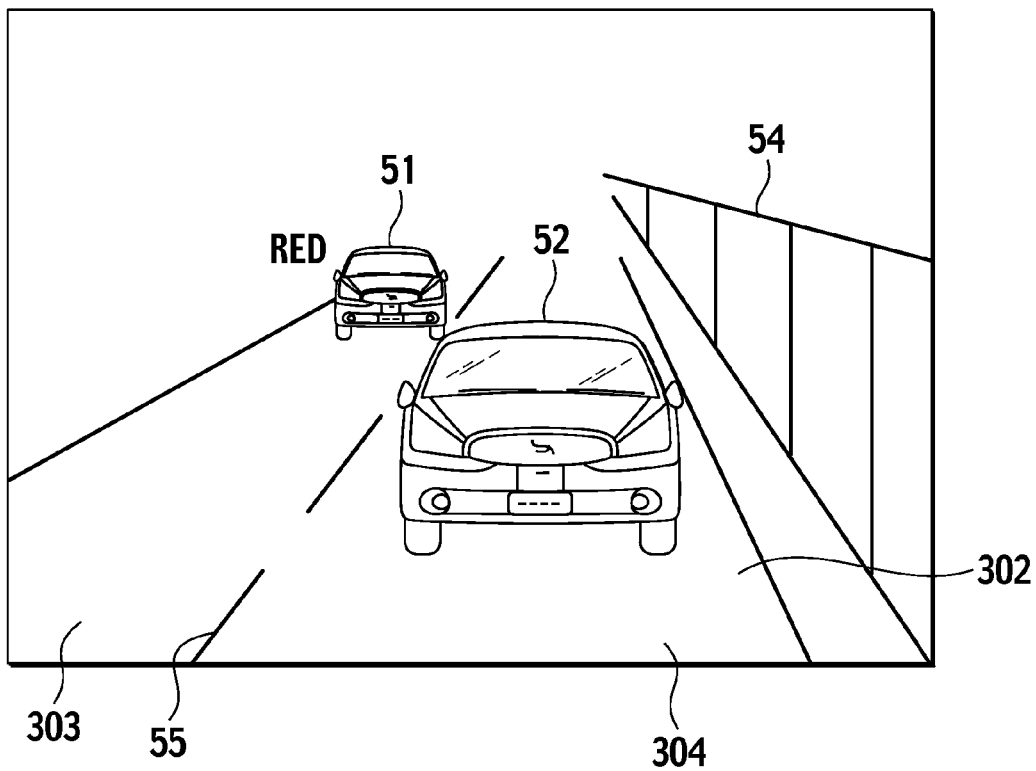
FIG. 9 is a view of a video where a red bias is applied for emphasis to the video of the high frequency component shown in FIG. 7 which is superimposed on the video of the low frequency components shown in FIG. 8.

Finally, the video of the high frequency component shown in FIG. 7 is emphasized by applying a red bias to the video, and superimposed on the video of the low frequency component shown in FIG. 8, thus generating a video emphasizing the approaching first rear vehicle 51. FIG. 9 is a view showing the video obtained by the combination of FIG. 7 and FIG. 8. In the display example shown in FIG. 9, the first rear vehicle 51 extracted as the high frequency component is displayed in red. The video generated by the video processing unit 23 is displayed on the monitor 30.

Figure 10:
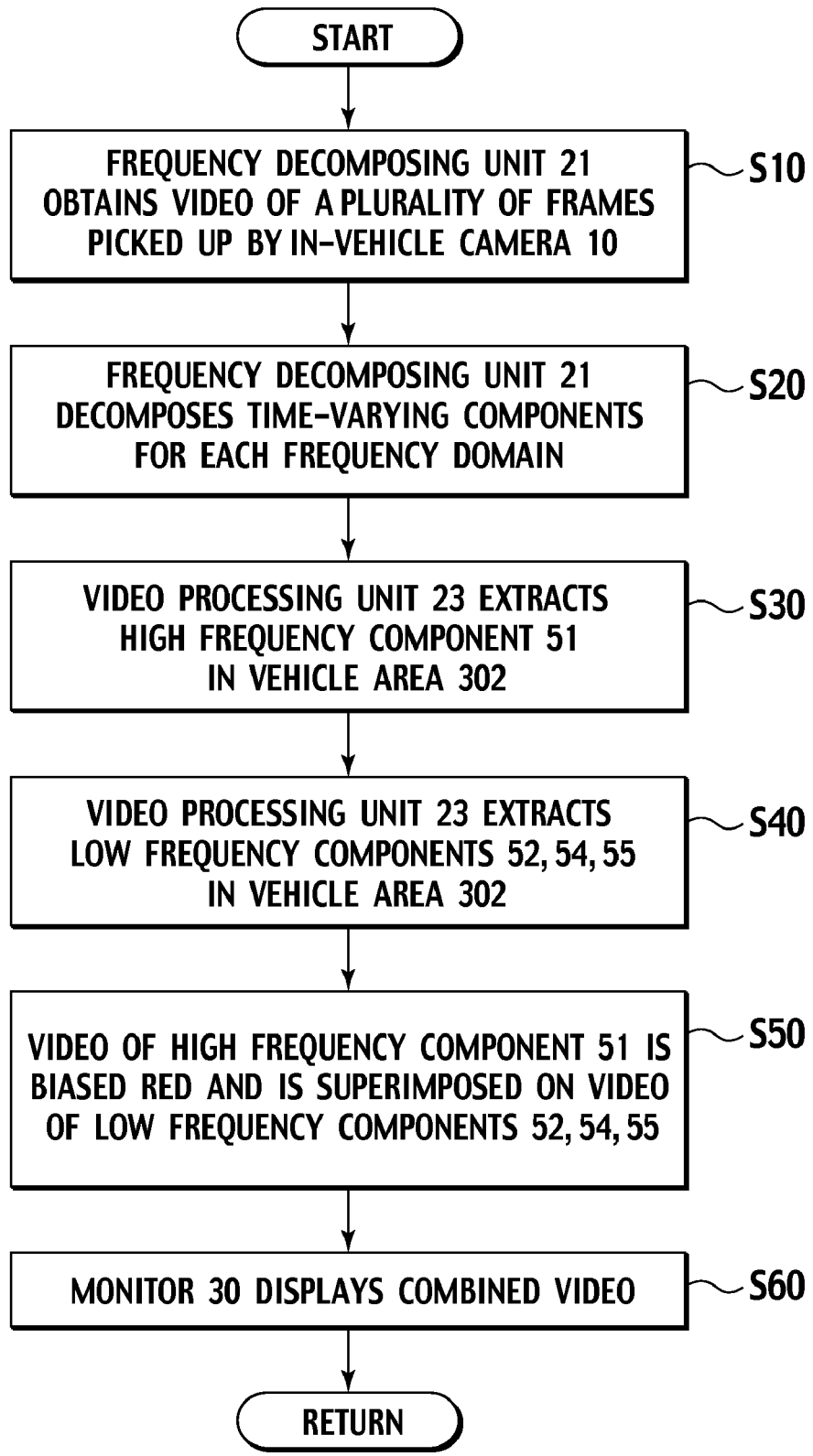
FIG. 10 is a flowchart showing a flow of processes performed in a processing unit.

FIG. 10 is a flowchart showing a flow of the processes performed in each of the frequency decomposing unit 21, memory unit 2, and video processing unit 23 in the processing unit 20 described above.

<Step S10>

In Step S10, the frequency decomposing unit 21 obtains a video of a plurality of frames picked up by the in-vehicle camera 10. Then, the process moves on to Step S20.

<Step S20>

In Step 20, the frequency decomposing unit 21 decomposes the time-varying components of the videos for each frequency domain. Then, the process moves onto Step S30.

<Step S30>

Based on the data which underwent the time-frequency decomposition process by the frequency decomposing unit 21, the video processing unit 23 extracts in Step S30 the data of the high frequency component (i.e., the first rear vehicle 51) within the vehicle area 302.

<Step S40>

The video processing unit 23 extracts in Step S40 the data of the low frequency components (i.e., the second rear vehicle 52, the side wall 54, and the white line 55). Then, the process moves onto Step S50.

<Step S50>

In Step S50, the video of the high frequency component (i.e., the first rear vehicle 51) is emphasized by applying a red bias to the video, and superimposed on the video of the low frequency components (i.e., the second rear vehicle 52, the side wall 54, and the white line 55), thus generating the video emphasizing the approaching vehicle 51.

<Step S60>

In the step S60 after Step S50, the monitor 30 displays the thus generated video.

According to the vehicle surroundings display unit 1 of the embodiment, based on the picked-up video of the surroundings of the subject vehicle 100, the first rear vehicle 51 which is approaching the subject vehicle 100 is detected, and the thus detected approaching vehicle 51 is displayed while being distinguished from the obstacle which is not approaching the subject vehicle 100. Therefore, a driver can easily identify the first rear vehicle 51 which is approaching the subject vehicle 100.

Further, according to the vehicle surroundings display unit 1 of the embodiment, the approaching vehicle 51 is detected based on the data obtained by decomposing the time-varying components of the picked-up videos for each frequency domain. Therefore, the first rear vehicle 51 approaching the subject vehicle 100 at the speed relative to that of the subject vehicle 100 can be detected highly accurately. According to this method, even when a number of vehicles are captured on the picked-up video, the approaching vehicle 51 can be detected with a small amount of operations (calculations).

Particularly set forth as follows: 1) The brightness variation (relative to time) of each pixel on the picked-up video is decomposed for each frequency domain. 2) Moreover, based on the decomposed data, the pixel area where the brightness variation (relative to time) has the certain frequency or higher is determined as the area where the approaching vehicle 51 is captured.

Therefore, the approaching vehicle 51 can be detected highly accurately.

Also, according to the vehicle surroundings display unit 1 of the embodiment, the display color for the detected approaching vehicle 51 is changed by the video processing unit 23. Therefore, the driver can easily distinguish the approaching vehicle 51 from the obstacle which is not approaching the subject vehicle 100.

According to the vehicle surroundings display unit 1 of the embodiment, the approaching vehicle 51 having the relative speed to the subject vehicle 100 can be identified by the driver of the subject vehicle 100 through the time-frequency decomposition including: extracting the approaching vehicle 51 as the pixel of the high frequency component in the vehicle area 302, and displaying the thus extracted approaching vehicle 51. With this, the number of operations (calculations) can be decreased.

The present invention is not limited to the foregoing embodiment. Specifically described as follows. As described in FIG. 7, the data of the high frequency component (i.e., the first rear vehicle 51) within the vehicle area 302 is extracted from the data which underwent the time-frequency decomposition process. After this, a space filter such as a sharpening filter or an edge emphasizing filter may be used for the thus extracted data, so as to emphasizedly display an edge (profile) of the approaching vehicle 51.

Figure 11:
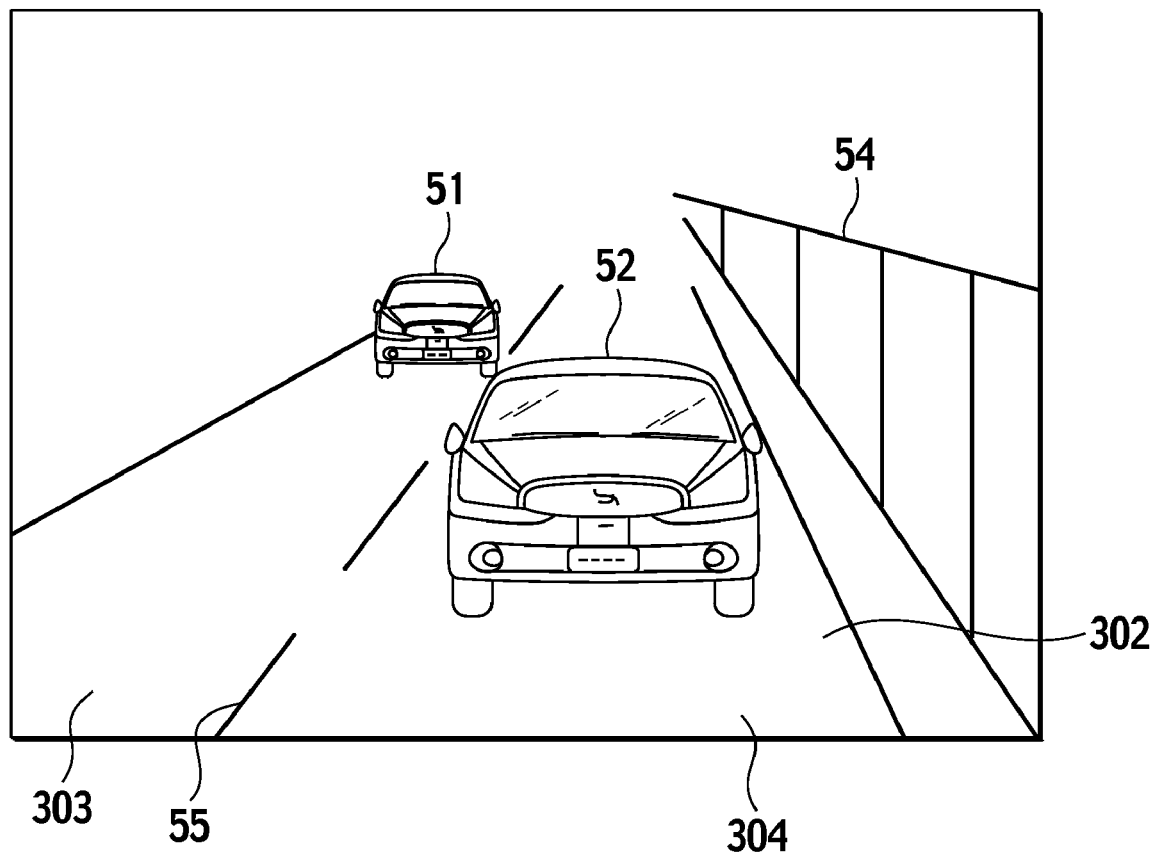
FIG. 11 is a view showing an example for displaying that an edge (profile) of an approaching vehicle is emphasized.

FIG. 11 is a view showing a display example where the edge of the approaching vehicle 51 is emphasized by the video processing unit 23. With the edge of the approaching vehicle 51 thus emphasized, the driver can more easily distinguish the approaching vehicle 51 from the obstacle which is not approaching the subject vehicle 100.

Although the detected approaching vehicle 51 is displayed with the red bias applied thereto in the foregoing embodiment, the color is not limited to red as long as the color is different from color information of the picked-up video. Alternately, a method of blinking the approaching vehicle 51 may be applied for distinguishing the approaching vehicle 51 from the obstacle which is not approaching the subject vehicle 100.

Moreover, the following structure is allowed:

Whether the detected approaching vehicle 51 is present in the adjacent lane area 303 or in the same lane area 304 is determined, such that the display color of the approaching vehicle 51 can be changed in accordance with the lane area 303 or 304 wherever the detected approaching vehicle 51 is present. For example, when the approaching vehicle 51 is present in the adjacent lane area 303, the approaching vehicle 51 may be displayed in yellow, while when the approaching vehicle 51 is present in the same lane area 304, the approaching vehicle 51 may be displayed in red. In this case, the driver can easily identify the lane in which the approaching vehicle 51 is present.

The parting line 305 for separating the background area 301 from the vehicle area 302 is set in advance, as described above. Otherwise, the parting line 305 may be so set as to be varied in accordance with a traveling state of the subject vehicle 100. For example, the background area 301 varies when the subject vehicle 100 is traveling down a hill or along a curve. Therefore, it is preferred to obtain a current location of the subject vehicle 100 from a navigation system or the like and then change the location of the parting line 305 in accordance with the thus obtained current location of the subject vehicle 100. By varying the parting line 305 in accordance with the traveling state of the subject vehicle 100, the information useful for the driver can be displayed more effectively.

In the data obtained by decomposing the brightness variation (relative to time) for each frequency; the lower the speed relative to the subject vehicle 100 is, the lower the frequency component is, while the higher the relative speed is, the higher the frequency component is. Therefore, when the display colors of the approaching vehicles 51 are so made as to be varied in accordance with the extracted frequencies, the approaching vehicles 51 can be displayed with different display colors in accordance with the speed relative to the subject vehicle 100. With this, among the vehicles 51 approaching the subject vehicle 100, the driver can distinguish the one traveling at a relatively high speed from the other traveling at a relatively low speed.

The display control method for the approaching vehicle 51 may be varied according to the type of road on which the subject vehicle 100 is traveling. For example, in a case where the subject vehicle 100 is traveling on an express way, the relative speed of the approaching vehicle 51 to be emphasizedly displayed may be set higher. Specifically, in the data obtained by decomposing the brightness variation (relative to time) for each frequency, the frequency to be extracted may be set higher in the case of the express way compared to a case where the subject vehicle 100 is traveling on a normal road.

In this case, the information of the type of road can be obtained from a road type sensor 27, for example, the navigation system.

Further, the display control method for the approaching vehicle 51 may be varied in accordance with the subject vehicle 100's traveling speed extracted by the speed sensor 28. For example, when the subject vehicle 100 stops, temporarily suspending the emphasized display of the approaching vehicle 51 can prevent all approaching vehicles 51 from being emphasizedly displayed.

According to the embodiment described above, only one in-vehicle camera 10 is provided. However, a plurality of in-vehicle cameras 10 may be provided. Also, a method for detecting the approaching vehicle 51 is not limited to the one aforementioned. Other detecting methods may be employed.

The structural elements in the embodiments are respectively set forth in claims in the following manner:

Particularly, the in-vehicle camera 10 corresponds to a pick-up unit, the processing unit 20 corresponds to the approaching vehicle sensor 24, the display processor 23, the frequency decomposing unit 21, and the relative speed identifier 25, and the monitor 30 corresponds to a display unit 30.

Note that the above description is only an example. For interpreting the present invention, the above description is, therefore, not limited to the above correspondence between the structural elements of the foregoing embodiment and the structural elements of the present invention.

This application is based on a prior Japanese Patent Application No. P2006-169694 (filed on Jun. 20, 2006 in Japan). The entire contents of the Japanese Patent Application No. P2006-169694 from which priority is claimed are incorporated herein by reference, in order to take some protection against translation errors or omitted portions.

The scope of the present invention is defined with reference to the following claims.

What is claimed is:

1. A vehicle surroundings display unit, comprising:
    a pick-up unit configured to pick up a video of vehicle surroundings;
    an approaching vehicle sensor configured to sense, based on the video picked up by the pick-up unit, an approaching vehicle which is approaching a subject vehicle;
    a display processor configured to perform an operation to display the approaching vehicle sensed by the approaching vehicle sensor while distinguishing the approaching vehicle from an obstacle which is not approaching the subject vehicle;
    a display unit configured to display the video which has undergone the displaying operation by the display processor; and
    a frequency decomposing unit configured to make the following operations detecting one or more frequencies:
        decomposing a time-varying component of one or more pixels of the picked-up video for each of the one or more frequencies,
        extracting one or more pixels having a frequency of the time-varying component higher than a certain frequency, and
        of the thus extracted one or more pixels of the picked up video, displaying the extracted one or more pixels in a vehicle area.

2. The vehicle surroundings display unit according to claim 1, further comprising:
    a relative speed identifier configured to identify a speed of the approaching vehicle relative to the subject vehicle based on the time-varying component decomposed for each frequency by the of the one or more frequencies decomposing unit,
    wherein the display processor changes how to display the approaching vehicle based on the relative speed identified by the relative speed identifier.

3. The vehicle surroundings display unit according to claim 1,
    wherein the display processor emphasizes an edge of the approaching vehicle sensed by the approaching vehicle sensor.

4. The vehicle surroundings display unit according to claim 1,
    wherein the display processor changes a display color of the approaching vehicle sensed by the approaching vehicle sensor.

5. The vehicle surroundings display unit according to claim 1, further comprising:
    a road type sensor configured to sense a type of a road where the subject vehicle is traveling,
    wherein the approaching vehicle sensor changes how to sense the approaching vehicle based on the type of the road sensed by the road type sensor.

6. The vehicle surroundings display unit according to claim 1, further comprising:
    a speed sensor configured to sense a speed of the subject vehicle, wherein the display processor changes how to display the approaching vehicle based on the speed sensed by the speed sensor.

7. The vehicle surroundings display unit according to claim 1, wherein the display processor blinks the approaching vehicle sensed by the approaching vehicle sensor.

8. The vehicle surroundings display unit according to claim 4, wherein
whether the detected approaching vehicle is present in a first lane area or in a second lane area is determined, such that the display color of the approaching vehicle can be changed in accordance with the first lane area or the second lane area wherever the detected approaching vehicle is present.

9. The vehicle surroundings display unit according to claim 1, wherein
a parting line for separating a background area from the vehicle area is so set as to be varied in accordance with a traveling state of the subject vehicle.

10. The vehicle surroundings display unit according to claim 4, wherein
approaching vehicles are displayed with different display colors in accordance with a speed of the approaching vehicle relative to the subject vehicle.

11. A method of displaying vehicle surroundings, comprising:
picking up a video of the vehicle surroundings;
sensing, based on the video thus picked up, an approaching vehicle which is approaching a subject vehicle;
performing a displaying operation to display the approaching vehicle thus sensed while distinguishing the approaching vehicle from an obstacle which is not approaching the subject vehicle;
displaying the video which has undergone the displaying operation of the approaching vehicle; and
decomposing a frequency, the decomposing including the following sub-operations detecting one or more frequencies:
decomposing a time-varying component of one or more pixels of the picked-up video for each of the one or more frequencies,
extracting one or more pixels having a frequency of the time-varying component higher than a certain frequency, and
of the thus extracted one or more pixels of the picked up video, displaying the extracted one or more pixels in a vehicle area.

12. A vehicle surroundings display unit, comprising:
picking-up means for picking up a video of vehicle surroundings;
approaching vehicle sensing means for sensing, based on the video picked up by the picking-up means, an approaching vehicle which is approaching a subject vehicle;
display processing means for performing an operation for displaying the approaching vehicle sensed by the approaching vehicle sensing means while distinguishing the approaching vehicle from an obstacle which is not approaching the subject vehicle;
displaying means for display processing the video which has undergone the displaying operation by the displaying means; and
frequency decomposing means configured to make the following operations detecting one or more frequencies:
decomposing a time-varying component of one or more pixels of the picked-up video for each of the one or more frequencies,
extracting one or more pixels having a frequency of the time-varying component higher than a certain frequency, and
of the thus extracted one or more pixels of the picked up video, displaying the extracted one or more pixels in a vehicle area.

* * * * *